United States Patent
Acx et al.

(10) Patent No.: US 9,481,342 B2
(45) Date of Patent: Nov. 1, 2016

(54) REINFORCED WIPER ELEMENT

(75) Inventors: Filip Acx, Oostkamp (BE); Ludo Adriaensen, Deerlijk (BE)

(73) Assignee: NV BEKAERT SA, Zwevegem (BE)

( * ) Notice: Subject to any disclaimer, the term of this patent is extended or adjusted under 35 U.S.C. 154(b) by 1052 days.

(21) Appl. No.: 10/297,617

(22) PCT Filed: Jun. 8, 2001

(86) PCT No.: PCT/EP01/06480
§ 371 (c)(1),
(2), (4) Date: Dec. 16, 2002

(87) PCT Pub. No.: WO02/00481
PCT Pub. Date: Jan. 3, 2002

(65) Prior Publication Data
US 2003/0126713 A1    Jul. 10, 2003

(30) Foreign Application Priority Data

Jun. 28, 2000 (EP) .................................. 00202238

(51) Int. Cl.
*B60S 1/38* (2006.01)
*B05D 7/14* (2006.01)

(52) U.S. Cl.
CPC ............ B60S 1/3801 (2013.01); B60S 1/3874 (2013.01); B60S 1/3879 (2013.01); *B05D 7/14* (2013.01); *B60S 2001/382* (2013.01); *Y10T 29/49622* (2015.01)

(58) Field of Classification Search
CPC .. B60S 1/3801; B60S 1/3874; B60S 1/3879; B60S 2001/382; Y10T 29/49622; B05D 7/14
USPC ........ 15/250.451, 250.452, 250.453, 250.43, 15/250.44, 250.361, 250.48; 29/558, 29/897.2, 428, 557; 148/251, 248; 427/290, 458, 430.1, 264, 261, 258, 427/289
See application file for complete search history.

(56) References Cited

U.S. PATENT DOCUMENTS

| | | | | |
|---|---|---|---|---|
| 3,114,926 A | * | 12/1963 | Deibel | 15/250.451 |
| 3,201,211 A | * | 8/1965 | Renshaw et al. | 428/659 |
| 3,891,471 A | * | 6/1975 | Summers et al. | 148/248 |
| 3,893,642 A | | 7/1975 | Van Vlaenderen | |
| 4,448,748 A | * | 5/1984 | Radtke et al. | 420/514 |
| 4,670,933 A | | 6/1987 | Toplenszky | |

(Continued)

FOREIGN PATENT DOCUMENTS

| DE | 3936597 | * | 5/1991 |
|---|---|---|---|
| EP | 0 667 266 B2 | | 8/1995 |

(Continued)

OTHER PUBLICATIONS

Patent Abstract KR 930000467 B, Jan. 21, 1993.
(Continued)

*Primary Examiner* — Gary Graham
(74) *Attorney, Agent, or Firm* — Foley & Lardner LLP

(57) ABSTRACT

The invention relates to a wiper element comprising a wiper blade made of an elastomeric material and reinforced with at least one elongated element (30). The elongated element (30) comprises a core (32) and a coating system (36). The coating system comprises a zinc alloy coating and a polyester coating on top of the zinc alloy coating. Using this coating system, the elongated element (30) is made corrosion resistant.

22 Claims, 1 Drawing Sheet

(56) References Cited

U.S. PATENT DOCUMENTS

| | | | |
|---|---|---|---|
| 4,774,105 A * | 9/1988 | Takazawa et al. | 427/185 |
| 4,793,020 A * | 12/1988 | Stratton et al. | 15/250.46 |
| 5,114,799 A * | 5/1992 | Ohashi et al. | 428/659 |
| 5,964,025 A * | 10/1999 | Buechele | 29/558 |
| 6,185,805 B1 * | 2/2001 | Rosiere et al. | 29/428 |
| 6,242,105 B1 * | 6/2001 | Joseph et al. | 428/598 |
| 6,346,292 B1 * | 2/2002 | Grubb et al. | 427/195 |
| 6,651,339 B2 * | 11/2003 | Mazurkiewicz et al. | 29/896.91 |

FOREIGN PATENT DOCUMENTS

| | | |
|---|---|---|
| EP | 0 098 362 A2 | 4/1999 |
| FR | 2 283 030 | 3/1976 |

OTHER PUBLICATIONS

Commercial Article—Passport, Polyethylene terephtalate coating on Bezinal coated wire, Mar. 2000, 1 page.
Bekaert article—Bezalplast, "Your coloured alternative to stainless Wires," with English translation, Mar. 2000, 8 pages.
Certificate of Registration for International Trademark, "Bezalplast," No. 723793, Nov. 4, 1999, 1 page.
Commercial Article, Passport Bezinal, Apr. 1999, 1 page.
Bekaert Commercial Article, Special Edition Wire 98 Dusseldorf, "An endless drive for new and better . . . ," 8 pages.

* cited by examiner

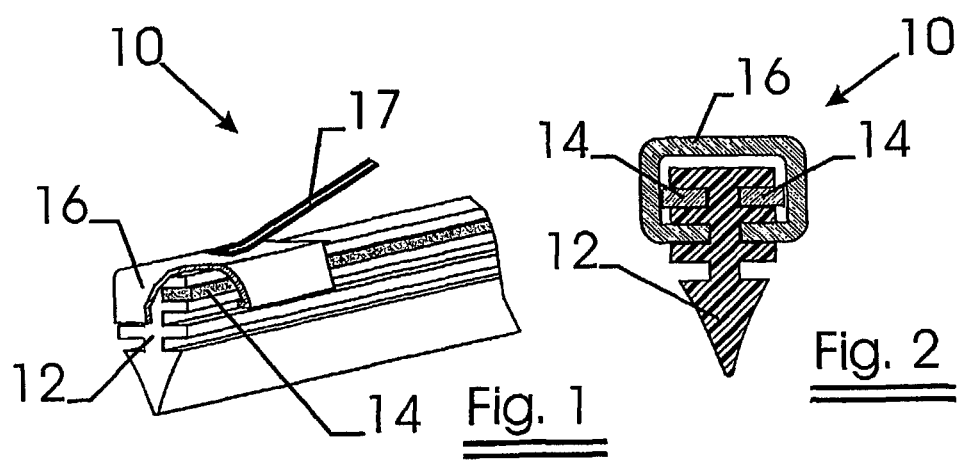
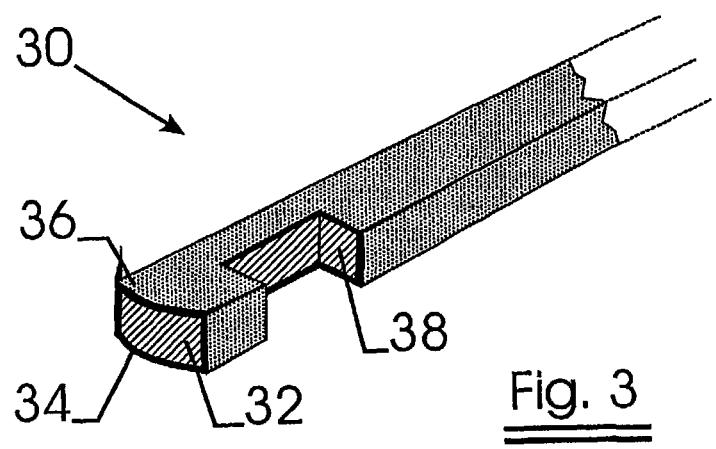
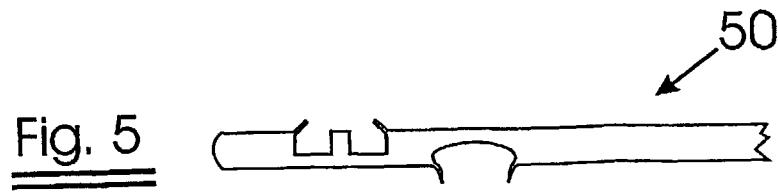

REINFORCED WIPER ELEMENT

CROSS REFERENCE

This is a national stage of PCT/EP01/06480, filed Jun. 8, 2001.

FIELD OF THE INVENTION

The invention relates to a reinforced wiper blade and to a coated metal wire adapted to reinforce a wiper blade.

BACKGROUND OF THE INVENTION

A wiper element is formed by a wiper blade made of an elastomeric material such as rubber. Conventionally, the wiper blade is reinforced by two elongated elements inserted in two longitudinally extending grooves of the wiper blade.

The reinforcement elements facilitate the wiping contact with the surface to be wiped by equalizing the forces needed for wiping.

Typically, the surface to be wiped is a curved glass surface.

The reinforcement elements have to be readily flexible throughout their length in a direction toward and away from the windshield to allow the wiper element to conform to the contour of the windshield so that efficient cleaning of the windshield can be obtained.

In addition, the reinforcement elements have limited flexibility in a direction transverse thereto to provide some rigidity for the wiper element as it is driven back and forth across the glass.

Generally, the reinforcement elements are made of metal. Since wiper elements have to withstand all weather conditions, it is necessary that the metal elements have a high corrosion resistance. Therefore, the wiper elements are typically reinforced with stainless steel strips.

Also the use of galvanised wires to reinforce wiper blades is known in the art. However, galvanised steel wires do not always meet the severe corrosion resistance requirements.

As the automotive industry is looking for black colored metal elements, this imposes a further requirement to the reinforcing elements of a wiper blade.

Either the conventional used stainless steel strips as the galvanised steel wires, both have the disadvantage not to be black colored.

SUMMARY OF THE INVENTION

It is an object of the present invention to provide a wiper blade reinforced with at least one reinforcement element characterised by a high corrosion resistance and thus by an excellent weather durability.

It is another object of the present invention to provide a wiper blade which is lightweight, strong, reliable and cost-effective to manufacture. It is still another object to provide a reinforcement element for a wiper blade having a colored coating, such as a black colored coating. Furthermore, it is an object to provide a reinforcement element having a coating which gives the metal element a high corrosion resistance and a good weather durability and which is characterised by a high adhesion to the metal element and by a high adhesion retention in humid conditions.

According to a first aspect of the invention a wiper element comprises a wiper blade made of an elastomeric material, such as rubber.

The wiper blade is reinforced with a number of elongated elements. Preferably, a wiper blade is reinforced with a number of reinforcement elements, inserted symmetrically and longitudinally in a number of longitudinally extending grooves of the wiper blade.

For example, a wiper blade is reinforced with one or two reinforcement elements.

A reinforcement element comprises a core and a coating system.

The core comprises a steel wire, which is preferably a steel wire with a substantially rectangular cross-section.

The coating system comprises two coating layers: a zinc alloy coating layer and a polyester coating layer.

The zinc alloy is applied on the steel wire and the polyester coating is applied on top of this zinc alloy layer.

After the reinforcement element is coated with the coating system, the element is cutted to a predetermined length. After this cutting step, the reinforcement element has uncoated cut ends.

Possibly, for fixing purposes, a number of notches is formed in the coated reinforcement element.

The notch or notches are preferably made at the longitudinal external side of the element, near its end.

The notches are created by a material removing operation after the wire has been coated with the coating system.

Suitable material removing operations are cutting, sawing, stamping or punching.

After the material removing operation is performed, the lateral edges of the notches remain uncoated.

Possibly, part of the zinc aluminium coating is spread over the uncoated cut ends after the material removing operation.

The steel wire has preferably a rectangular or substantially rectangular cross-section, for example a rectangular cross-section with rounded edges.

The wire has preferably a width between 1 mm and 10 mm, for example 2.5 mm or 4.10 mm.

The thickness of the wire preferably ranges from 0.50 to 1.30 mm. The thickness is for example 0.70 mm.

A tensile strength of at least 1500 N/mm$^2$ is preferred, more preferably the tensile strength is greater than 1700 N/mm$^2$, for example 1800 or 2000 N/mm$^2$.

To obtain the desired tensile strength the carbon content is greater than 0.40%. More preferably, the carbon content ranges between 0.60 and 0.85%.

The protection of steel against corrosion has traditionally been achieved by galvanising.

In order to improve the corrosion resistance a zinc aluminium alloy can be applied to a steel element.

It has been proven that a steel element coated with a zinc aluminum alloy layer exhibits a longer corrosion resistance than a zinc coated steel wire.

However, steel coated with a zinc aluminum alloy does not meet the ever increasing corrosion resistance requirements, especially not when the steel is exposed to a humid environment.

A known problem associated with zinc and most zinc alloy coatings is the occurrence of white rust.

According to the present invention a coating system which gives the steel wire an improved corrosion resistance has been developed. The coating system comprises a zinc alloy layer and a polyester coating on top of this zinc alloy coating.

The zinc alloy layer preferably comprises between 2 and 15% Al. Possibly, between 0.1 and 0.4% of a rare earth element such as Ce and/or La can be added in order to improve properties like fluidity and wettability of the melt.

The zinc alloy layer can be applied by any conventional technique such as chemical plating, melt plating, melt spraying and electroplating. A preferred method to apply the zinc alloy layer is by hot dip.

The zinc alloy layer preferably has a surface density higher than 50 $g/m^2$, for example 70 $g/m^2$.

An organic coating layer is applied on top of the zinc alloy layer.

The organic coating has to meet a number of requirements.

A first requirement is that a good adhesion with the metal coating layer has to be obtained.

Furthermore, the adhesion should be maintained during the life time of wiper element; even when it is exposed to a humid environment and/or to water, snow and ice.

Moreover, the organic coating should be sufficiently deformable so that the reinforcement element keeps its flexibility.

Polyester coatings fulfill these requirements.

Suitable polyester coatings are polyethylene terephtalate (PET), polyethylene naphtalate (PEN) and polybutylene terephtalate (PBT). Within the context of the present application the terms "polyethylene terephtalate", "polyethylene naphtalate" and "polybutylene terephtalate" denote not only homopolymers of ethylene therephtalate, ethylene napthalate and butylene terephtalate but also copolymers of ethylene terephtalate containing for example not more than 20% of other copolymerized units, e.g. derived from other acids than terephtalic acid, such as isophtalic acid or from other glycols than ethylene glycol. The polymer may also contain mixtures of polymers in order to modify certain of the properties.

Polyethylene terephtalate has the advantage of having good barrier properties e.g. to water and of having a good adhesion with a properly prepared steel wire without requiring a primer to ensure the adhesion. Polyethylene naphtalate has even better barrier properties than polyethylene terephtalate but has the drawback of being more expensive than polyethylene terephtalate.

The polyester coating can be applied by any conventional used technique.

Preferably, the polyester coating is applied by extrusion.

The thickness of the polyester coating ranges preferably from 15 μm to 250 μm, and more preferably from 30 μm to 100 μm.

The coating system comprising the zinc alloy layer and the polyester coating offers the reinforcement element an excellent corrosion protection.

Surprisingly, it has been found, that the coating system according to the present invention offers the reinforcement a good corrosion protection at the surfaces of the element that are not coated, i.e. at the cut ends and at the laterally edges of the notches.

The zinc alloy coating provides cathodic protection at these uncoated surfaces. The protection is further improved by the polyester coating, applied on top of this zinc alloy coating. The polyester coating shows an excellent adhesion to the zinc alloy coating.

The corrosion protection at these uncoated surfaces is considerably higher than the uncoated surfaces of a steel element on which only a zinc alloy coating is applied.

By using the coating system according to the present invention, expensive and time consuming treatments to protect the uncoated parts of the reinforcement element against corrosion are redundant.

In other embodiments the reinforcement elements are curved or folded, either at their ends or over their whole length.

The notch can have any shape. In principle, any shape adapted to locate a claw is possible. Possibly, the notches have a rectangular or triangular shape.

Alternatively, a notch can be defined by a pair of longitudinally removed abutments, adapted to locate a claw in between these abutments.

According to a second aspect a method of manufacturing a wiper element according to the invention is provided.

The method comprises the steps of:
  providing a reinforcement element comprising a core and
    a coating system, said core being a substantially flat
    steel wire and said coating system comprising a zinc
    alloy coating layer and a polyester coating layer;
  providing a wiper blade;
  reinforcing said wiper blade with a number of said
    reinforcement elements.

The step of providing a reinforcement element may comprise the following steps:
  providing a steel wire;
  applying a zinc alloy coating on said steel wire;
  flattening the obtained steel wire;
  applying a polyester coating on top of said zinc alloy
    coating;
  cutting the coated steel wire to the desired length.

Alternatively, the reinforcement element can be manufactured by a method comprising the steps of:
  providing a steel wire with a substantially flat cross-
    section;
  applying a zinc alloy coating on said steel wire;
  applying a polyester coating on top of said zinc alloy
    coating;
  cutting the coated steel wire to the desired length.

Possibly, the method of manufacturing a reinforcement element further comprises the step of
  forming at least one notch at the longitudinal external side
    of said reinforcement element.
and/or the step of
  folding, curving or bending the reinforcement element.

The notches are preferably formed by a punching or stamping operation.

According to a third aspect an elongated element adapted to reinforce a wiper blade is provided. The reinforcement element comprises a core and a coating system.

The core is a steel wire which preferably has a substantially rectangular cross-section. The coating system comprises a zinc alloy coating and a polyester coating.

The zinc alloy coating is applied on the steel core and the polyester coating is applied on top of the zinc alloy coating. The element has uncoated cut ends.

Possibly, for fixing purposes, one or more notches are formed in the coated reinforcement element. The notch or notches are preferably made at the longitudinal external side of the element, near its ends.

BRIEF DESCRIPTION OF THE DRAWINGS

The invention will now be described in more detail with reference to the accompanying drawings wherein.

FIG. 1 shows a view of a wiper element comprising a wiper blade with two reinforcement elements according to the present invention;

FIG. 2 is a cross-section of a wiper element as shown in FIG. 1;

FIG. 3 shows a partial view of an element adapted to reinforce a wiper blade.

FIGS. 4 and 5 show two other embodiments of reinforcement elements.

DESCRIPTION OF THE PREFERRED
EMBODIMENTS OF THE INVENTION

FIG. 1 shows a perspective view of a part of a windshield wiper element 10 according to the invention. FIG. 2 is a cross-sectional view of the wiper element shown in FIG. 1.

The wiper blade 12 is made of rubber and is reinforced with two reinforcement elements 14 inserted in two longitudinally extending recesses provided in the wiper blade.

The reinforcement elements stiffen the rubber wiper blade while allowing it to be flexible enough so that it can conform to the surface of a curved windshield.

An anchoring claw 16, fixed on a frame 17, partially surrounds the upper portion of the wiper blade. The claw is thereby positioned in a pair of notches. It compresses the reinforcement elements towards each other on the wiper blade and immobilises them.

Other embodiments of wiper blades are reinforced by only one reinforcement element located in a longitudinally extending recess centrally provided in the wiper blade.

Possibly, such a reinforcement element is provided with notches on both longitudinal sides.

FIG. 3 shows a view of a portion of a reinforcement element 30 according to the present invention.

The core comprises a flattened steel wire 32 with a thickness of 0.70 mm and a width of 2.40 mm.

The steel wire has a carbon content between 0.50 and 0.70% and is characterised by a tensile strength between 1600 and 1800 N/mm².

The coating system comprises a zinc aluminium coating 34 and a PET coating 36 on top of this zinc aluminium coating.

The zinc aluminium coating comprises 95% Zn and 5% Al. The thickness of the zinc aluminium coating is 60 g/m².

The zinc coated steel wire is covered with a PET coating by means of an extrusion process.

The PET coating is black colored.

After the coating system is applied, the coated reinforcement element has a thickness of 0.80 mm and a width of 2.50 mm.

Finally, the coated element is cut to the desired length. After this cutting step, the cut ends remains uncoated.

Possibly, after the cutting step, part of the zinc aluminium coating is spread over the uncoated cut ends.

The longitudinal end portion is edge-punched to form a claw retaining notch 38.

Another example of a reinforcement element comprises a flattened steel wire with a thickness of 0.90 mm and a width of 7.00 mm.

The steel wire has a tensile strength between 1850 and 2050 N/mm².

A zinc aluminium coating having a thickness of 40 g/m² is applied on the steel wire and finally a PET coating is applied on top of the zinc aluminium coating.

The final thickness of the coated wire is 1.00 mm, the final with is 7.20 mm.

Still a further example of a reinforcement element comprises a flattened steel wire with a thickness of 0.70 mm and a width of 4.10 mm. After the coating system is applied, the coated wire has a thickness of 0.80 mm and a width of 4.35 mm.

Some embodiments of edge-punched reinforcement elements are shown in FIGS. 4 and 5.

The above-described reinforcement element is manufactured as follows:

A steel wire is drawn to the desired diameter in various subsequent steps. If needed, the drawing steps may be alternated with one or more intermediate thermal treatments such as patenting.

The steel wires are subjected to a hot dip treatment to apply the zinc alloy coating.

The coated wire is rolled into a flat wire in a subsequent step.

A PET coating with a thickness of 50 µm is applied on the flat wire.

The wire is cut to the desired length and the longitudinal end portions are edge-punched to form notches 38.

In order to evaluate the corrosion resistance of the reinforcement element, this element is subjected to a salt spray test according to ASTM B117 or DIN 5002 SS.

The time until the first red rust appears on the non-coated surfaces is measured. Three different coated flat steel wires are compared in table 1 and table 2: the first wire comprises a steel wire on which a PET coating is applied; the second wire comprises a steel wire coated with a zinc aluminium coating; whereas the third wire corresponds with a steel wire on which a coating system according to the present invention is applied.

Table 1 shows the corrosion resistance at the non-coated cut ends, whereas table 2 shows the corrosion resistance at the non-coated laterally edges of the notches.

TABLE 1

| | | First red rust after (hours) |
|---|---|---|
| 1 Core: | Steel wire: 2.40 × 0.70 mm | 24 |
| Coating: | PET coating | |
| Final thickness: | 0.80 mm | |
| 2 Core: | Steel wire: 2.40 × 0.70 mm | 240 |
| Coating: | Zn—Al alloy | |
| Final thickness: | 0.80 mm | |
| 3 Core: | Steel wire: 2.40 × 0.70 mm | >1000 |
| Coating: | Zn—Al alloy (70 g/m²) + PET | |
| Final thickness: | 0.80 mm | |

TABLE 2

| | | First red rust after (hours) |
|---|---|---|
| 1 Core: | Steel wire: 2.40 × 0.70 mm | 24 |
| Coating: | PET coating | |
| Final thickness: | 0.80 mm | |
| 2 Core: | Steel wire: 2.40 × 0.70 mm | 144 |
| Coating: | Zn—Al alloy | |
| Final thickness: | 0.80 mm | |
| 3 Core: | Steel wire: 2.40 × 0.70 mm | 720 |
| Coating: | Zn—Al alloy (70 g/m²) + PET | |
| Final thickness: | 0.80 mm | |

It can be concluded from table 1 and table 2 that the zinc alloy coating offers the wire an excellent cathodic protection.

Even if a steel wire coated with the coating system according to the present invention is exposed to salt spray testing of 2000 hours, there is no red rust occurring.

The corrosion resistance at the non-coated surfaces is strongly improved by applying a PET coating on top of the zinc alloy coating.

A standard test to evaluate the adhesion or bond between the polyester coating and the tensile member is carried out as follows.

Referring to FIG. 3, a length of a steel wire 32 with a zinc alloy coating 34 and on top of this zinc alloy coating a PET coating 36 is taken.

The polyester coating 36 is removed in the longitudinal direction over a length of about five cm, on both sides of the wire, by means of the sharp side of a cutting knife. By means of the blunt side of the cutting knife the polyester coating 36 is slightly lifted. Finally, an attempt is made to pull the polyester coating off the steel wire with the fingers. An evaluation is made according to following observations:

| Rating | Description |
| --- | --- |
| 0 more than excellent | Nothing can be removed from the wire, the lifted coating breaks right away when pulling. |
| 1 excellent | No further coating can be pulled off with the fingers but very small parts can be removed by means of a knife. |
| 2 good | Small strips of less than 1 cm can be pulled off with great difficulty or by pulling very carefully. |
| 3 less good | Stnps of about 2 cm can be pulled off with some difficulty or by pulling carefully. |
| 4 bad | Strips of 2 cm can be pulled off very easily. |
| 5 bad | The film is hanging loose after having removed the coating on both sides. |

All tested tensile elements obtained a rating of 0, 1 or 2. Consequently, it can be concluded that there is a strong adhesion between the polyester coating and the metal.

The invention claimed is:

1. A wiper element comprising:
a wiper blade made of an elastomeric material, wherein the wiper blade is reinforced with at least one elongated element, wherein the elongated element includes at least one edge-punched notch;
said elongated element comprising a core and a coating system, wherein the core is a steel wire and said coating system comprises a zinc alloy coating and a polyester coating;
wherein said zinc alloy coating is applied on said core and said polyester coating is applied on top of said zinc alloy coating;
wherein said coated elongated element has uncoated cut ends and edges of said at least one edge-punched notch are uncoated;
wherein said coating system provides said elongated element with corrosion protection at the uncoated cut ends and at the uncoated edges of said at least one edge-punched notch; and
wherein the steel wire has a carbon content between 0.60 to 0.85%.

2. A wiper element according to claim 1, wherein said steel wire has a substantially rectangular cross-section.

3. A wiper element according to claim 1, wherein said zinc alloy comprises between 2 and 15% Al.

4. A wiper element according to claim 3, wherein the zinc alloy comprises between 0.1 and 0.4% of a rare earth element.

5. A wiper element according to claim 1, wherein said polyester coating is polyethylene terephtalate (PET), polyethylene naphtalate (PEN), or polybutylene terephtalate (PBT).

6. A wiper element according to claim 1, wherein said zinc alloy coating has a coating weight of at least 40 g/m$^2$.

7. A wiper element according to claim 1, wherein said polyester coating has a thickness ranging from 25 to 250 μm.

8. A method of manufacturing a wiper element according to claim 1, said method comprising the steps of
providing a reinforcement element comprising a core and a coating system, said core being a substantially flat steel wire and said coating system comprising a zinc alloy coating layer and a polyester coating layer;
providing a wiper blade;
reinforcing said wiper blade with at least one reinforcement element to provide the wiper element according to claim 1.

9. A method according to claim 8, wherein said step of providing a reinforcement element comprises the steps of
providing a steel wire;
applying a zinc alloy coating on said steel wire;
flattening the obtained steel wire;
applying a polyester coating on top of said zinc alloy coating;
cutting the coated steel wire to the desired length.

10. A method according to claim 9, further comprising the step of forming a number of notches at the longitudinal side of said reinforcement element.

11. A method according to claim 9, further comprising the step of folding, curving or bending said reinforcement element.

12. A method according to claim 9, further comprising a step of folding, curving, or bending the reinforcement element.

13. A method according to claim 9, wherein the zinc alloy comprises between 2 to 15% Al, and between 0.1 to 0.4% of a rare earth element.

14. A method according to claim 9, wherein the polyester coating is polyethylene terephtalate (PET), polyethylene naphtalate (PEN), or polybutylene terephtalate (PBT).

15. A method according to claim 9, wherein the polyester coating has a thickness ranging from 25 to 250 μm.

16. A method according to claim 9, wherein the steel wire has a tensile strength of at least 1500 N/mm$^2$.

17. A method according to claim 8, wherein said step of providing a reinforcement element comprises the steps of
providing a steel wire with a substantially flat cross-section;
applying a zinc alloy on said steel wire;
applying a polyester coating on top of said zinc alloy coating;
cutting the coated steel wire to the desired length.

18. A method according to claim 8, further comprising a step of rolling the coated steel wire into a flattened elongated element before a step of cutting.

19. A wiper element according to claim 1, wherein the steel wire has a tensile strength of at least 1500 N/mm$^2$.

20. A wiper element according to claim 1, wherein the steel wire is made of a steel other than stainless steel.

21. A wiper element comprising:
a wiper blade made of an elastomeric material, wherein the wiper blade is reinforced with at least one elongated element, wherein the elongated element includes at least one edge-punched notch;
said elongated element comprising a core and a coating system, wherein the core is a steel wire and said coating system comprises a zinc alloy coating and a polyester coating;
wherein said zinc alloy coating is applied on said core and said polyester coating is applied on top of said zinc alloy coating;

wherein said coated elongated element has uncoated cut ends and edges of said at least one edge-punched notch are uncoated;

wherein said coating system provides said elongated element with corrosion protection at the uncoated cut ends and at the uncoated edges of said at least one edge-punched notch; and wherein said zinc alloy comprises between 2 and 15% Al.

22. A wiper element comprising:

a wiper blade made of an elastomeric material, wherein the wiper blade is reinforced with at least one elongated element, wherein the elongated element includes at least one edge-punched notch;

said elongated element comprising a core and a coating system, wherein the core is a steel wire and said coating system comprises a zinc alloy coating and a polyester coating;

wherein said zinc alloy coating is applied on said core and said polyester coating is applied on top of said zinc alloy coating;

wherein said coated elongated element has uncoated cut ends and edges of said at least one edge-punched notch are uncoated;

wherein said coating system provides said elongated element with corrosion protection at the uncoated cut ends and at the uncoated edges of said at least one edge-punched notch; and wherein said zinc alloy coating has a coating weight of at least 40 g/m$^2$.

* * * * *